(No Model.)  3 Sheets—Sheet 1.
C. H. RHOOD.
FILTER.

No. 597,248.  Patented Jan. 11, 1898.

Witnesses:
Jas. D. Garfield
H. J. Clemons

Inventor,
Charles H. Rhood,
by Chapin & Co
Attorneys.

(No Model.) 3 Sheets—Sheet 2.

C. H. RHOOD.
FILTER.

No. 597,248. Patented Jan. 11, 1898.

Witnesses: J. W. Garfield, H. I. Clemons

Inventor, Charles H. Rhood,
by Chapin & Co.
Attorneys.

(No Model.)   3 Sheets—Sheet 3.

C. H. RHOOD.
FILTER.

No. 597,248.   Patented Jan. 11, 1898.

Witnesses:
J. D. Garfield
K. J. Clemons

Inventor,
Charles H. Rhood,
by Chapin & Co.
Attorneys.

UNITED STATES PATENT OFFICE.

CHARLES H. RHOOD, OF NORTHAMPTON, MASSACHUSETTS.

FILTER.

SPECIFICATION forming part of Letters Patent No. 597,248, dated January 11, 1898.

Application filed August 7, 1897. Serial No. 647,493. (No model.)

*To all whom it may concern:*

Be it known that I, CHARLES H. RHOOD, a citizen of the United States of America, residing at Northampton, (Florence,) in the county of Hampshire and State of Massachusetts, have invented new and useful Improvements in Filters, of which the following is a specification.

This invention relates to filtering apparatus for the purification of water and other liquids, the object being to provide an improved apparatus of this class in respect to efficiency of said purification, to convenience of manipulation for cleansing, and durability; and the invention consists in various details of construction and arrangement of parts of the device, all as hereinafter set forth, and more particularly pointed out in the claims.

Figure 1:
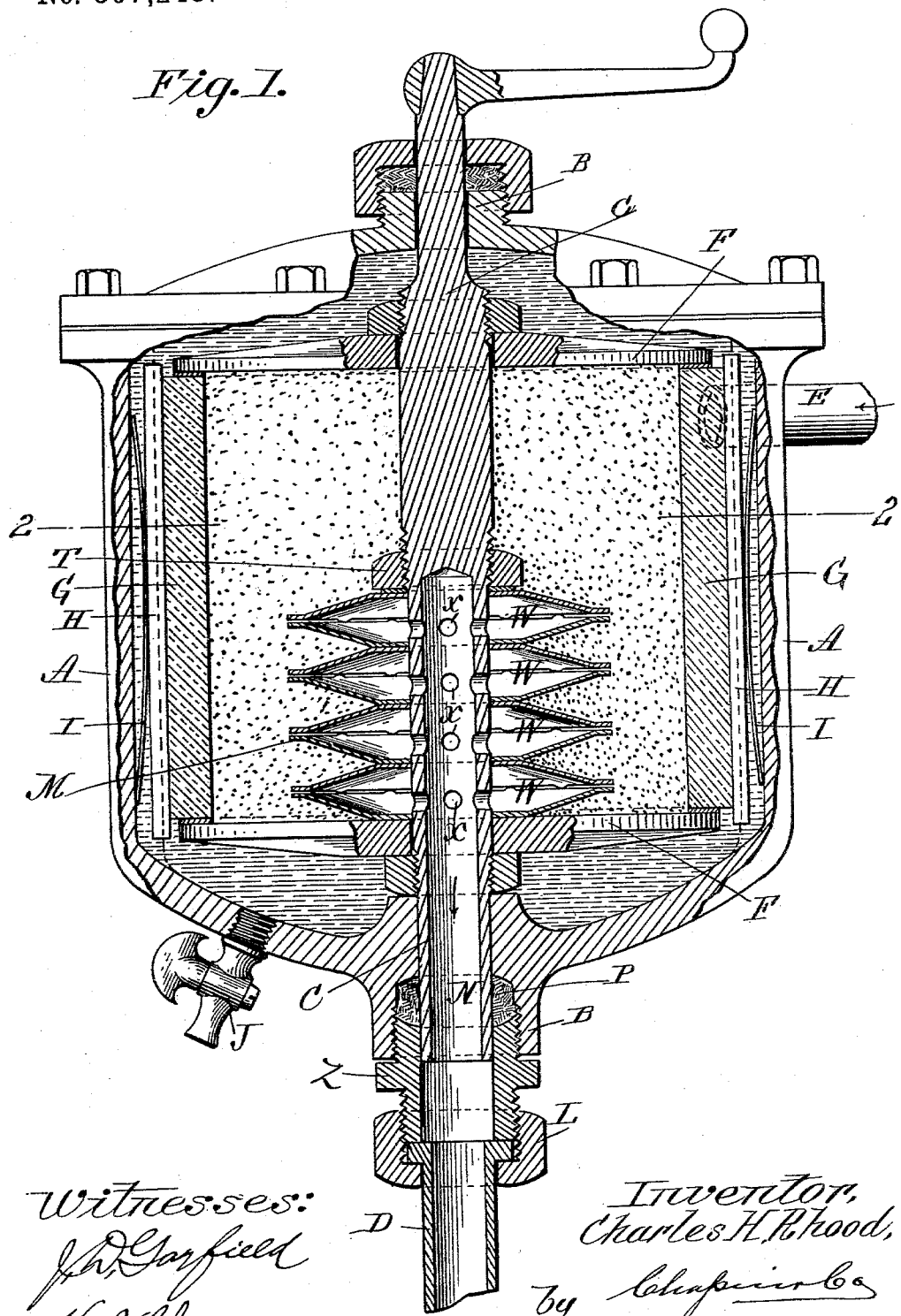
Figure 2:
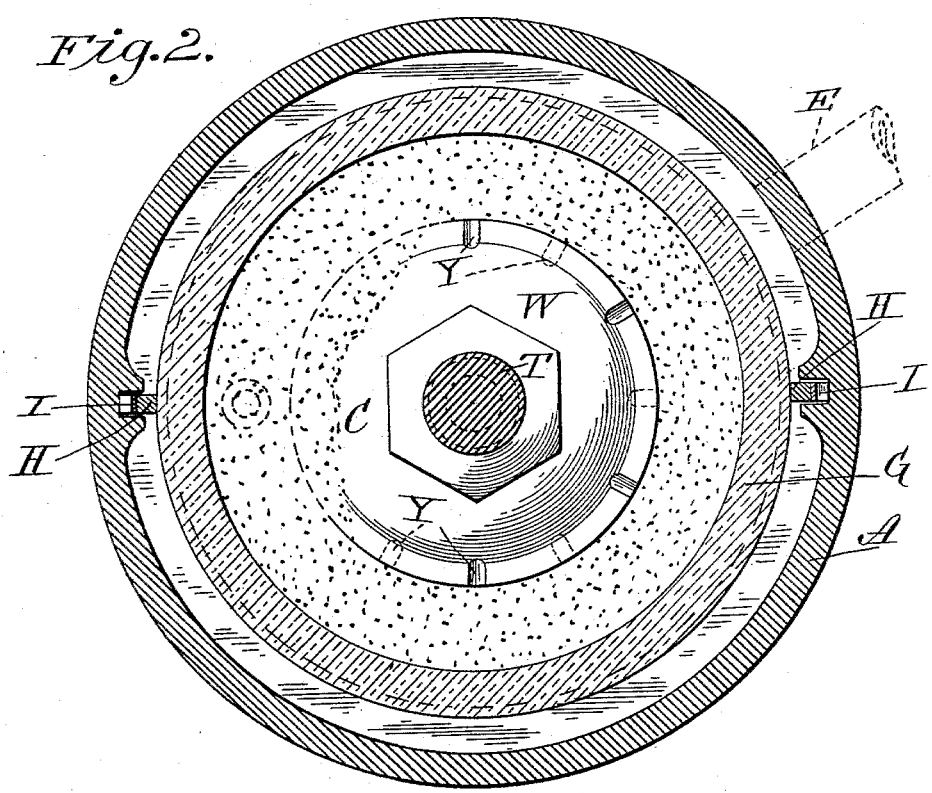
Figure 3:
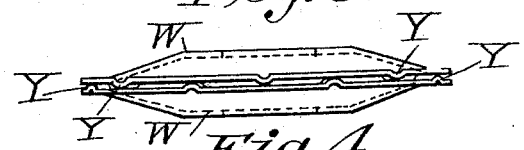
Figure 4:
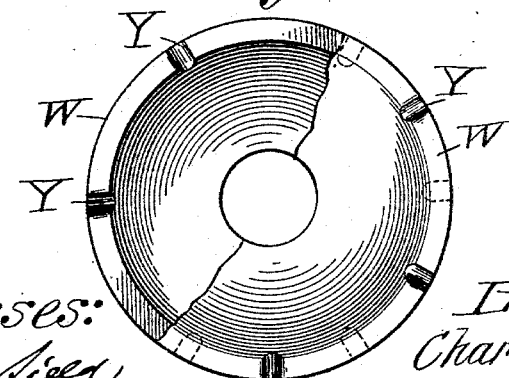
Figure 5:
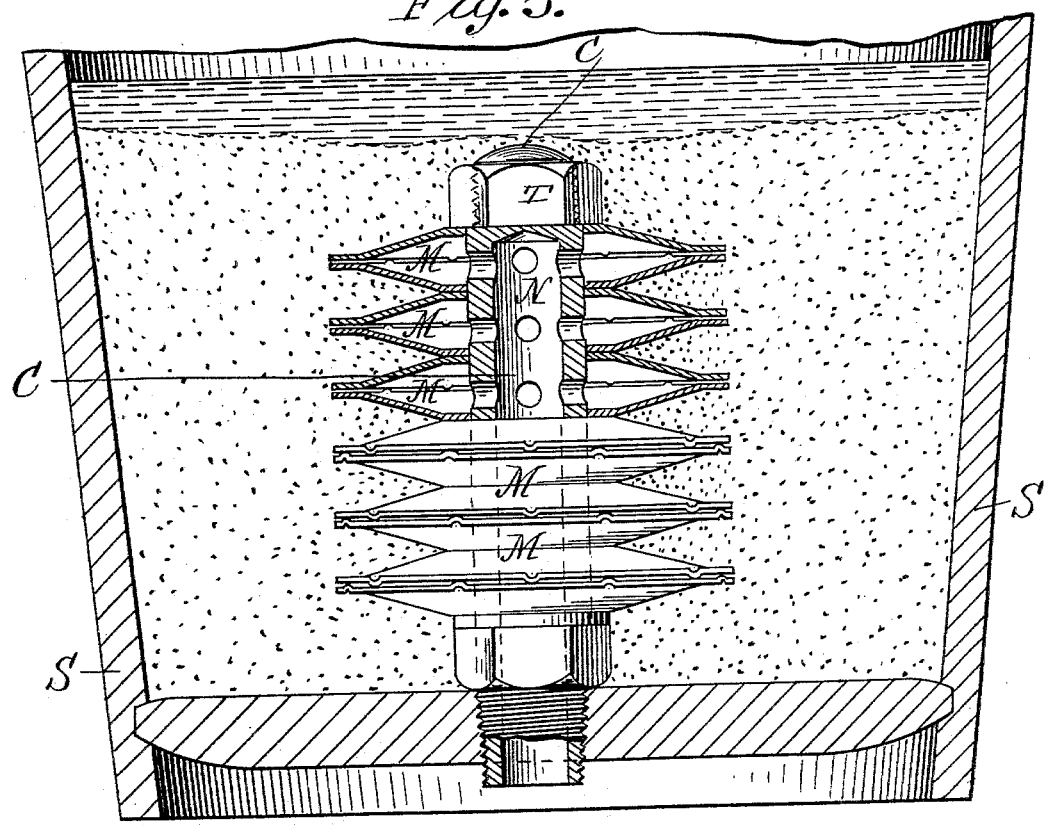
Figure 6:
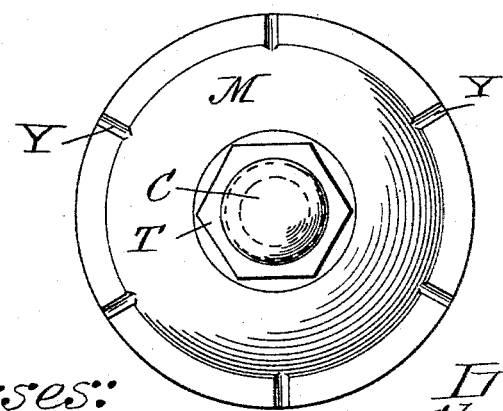

In the drawings forming part of this specification, Figure 1 is a vertical sectional view of a filtering apparatus embodying my improvements. Fig. 2 is a transverse section on line 2 2, Fig. 1. Figs. 3 and 4 are respectively a side and a plan view of certain of the filtering elements fully described below. Fig. 5 is a side elevation, partly in section, of a group of certain of the filtering elements illustrated in Fig. 1, shown detached from the last-named figure and adapted to be used in gravity filtration. Fig. 6 is a top plan view of the groups of filtering elements M of Fig. 5.

Referring to the drawings, A indicates a metallic case of cylindrical form having a cover secured on its upper end, as shown, and a neck-shaped opening through the bottom thereof, in which is a bearing B for a central shaft C, and a similar bearing for the latter is provided in said cover. Said metallic case and cover will hereinafter be designated as the "filter-case." The said central shaft C is revoluble by a suitable crank on its upper extremity, as shown, and is supported in bearings at the opposite ends of said filter-case, and has an internal water-passage N, extending about one-half of its length from its lower end upward. The lower end of said central shaft terminates in a coupling-tube Z, which is screwed into the bottom of said filter-case, and above said tube is a suitable chamber to receive the packing P. A discharge-pipe D is connected to the lower end of said tube Z by a nut L. The upper end of said central shaft C is provided with the suitably-packed bearing B, whereby water is prevented from escaping thereat, and the shaft thus supported may be revolved without disturbing its water-conducting connection with the said discharge-pipe D. Two flanges F F are carried on said central shaft C, a nut on the latter, as shown, back of each flange, serving to force the latter against the opposite ends of a filtering-cylinder G, as below set forth. Suitable packing is placed between each of said flanges and the end of the cylinder to exclude water at those points. On said shaft C, within said cylinder G, are placed, one upon the other, a group of filtering-boxes M, the lower one of said boxes resting against the lower flange F of said filtering-cylinder. A nut T, screwed on said shaft, holds said boxes in the positions shown in Fig. 1. Within said filtering-cylinder and packed around said filtering-boxes M on the central shaft C is placed suitable clean sand, which has a filtering action upon water after the latter shall have passed through the wall of said cylinder. Perforations $x$ are made through the sides of the hollow portion of said shaft, through which water may flow from the interior of said filtering-boxes M, flowing in said shaft in the direction of the arrow shown therein, and thence through said discharge-pipe D. Each of said filtering-boxes consists of two concavo-convex metal plates W, each having a narrow flat border, and a central portion substantially in a plane with said border, to the end that said boxes may be applied side by side on a common water-conductor, as said central hollow shaft C. The said flat border of each metal plate has projections Y thrown out thereon by indenting the opposite side of the border, as shown in Figs. 3 and 4. Said projections are in practice very inconsiderable and only sufficient to maintain such a separation of the two borders of said filtering-boxes as will barely permit water to flow therebetween, to the end that no fine particles of matter that may be carried in the water shall be allowed to pass into said filtering box or boxes. The manner of fixing said separation of the two borders of the metal plates W, forming each box—that is, by indenting one side of the border, thereby throwing out the opposite side—provides for the most accurate determination of the degree of said separation, which, for thoroughly-clean filtering, is a most important element. Water is supplied to the interior of said filter-case A by means of any suitable pipe, as E, and said case is emptied of water for cleaning the same by a cock J at the lower end thereof. For the purpose of conveniently and effectually cleaning the outer surface of the filtering-cylinder G by removing vegetable and other objectionable matter that shall be deposited on said cylinder-surface one or more scrapers H, preferably of metal bars, are placed in said case, each end in a recess, as shown, (see Figs. 1 and 2,) vertically opposite the outer surface of said cylinder, and each held yieldingly thereagainst by a spring I between each bar and the adjoining side of said case. Thus when the outer side of said cylinder G becomes foul the waste-cock J is opened, water is let freely run into the case through said pipe E, and by turning the central hollow shaft C, and through the latter said cylinder, the surface of the latter is carried against said scrapers H, which remove said foulness, and the running water carries the same out of the filter-case, after which said cock J is closed and the filtering proceeds as before—that is, the water from said pipe E under more or less pressure fills the portion of the filter-case surrounding said filtering-cylinder G, slowly filters through the latter and through the said sand therein, and subsequently passes between the slightly-separated borders of said filtering-boxes M, and from said boxes the filtered water escapes through the said perforations $x$ in the side of said hollow shaft C, into the interior thereof, and thence into the discharge-pipe D, from which it is drawn for use. The said cylinder G, together with the hollow shaft C and means for revolving the same, the scrapers H for cleaning said cylinder and its inclosing case, constitute of themselves an effective filtering device.

Referring to Fig. 5, it is there shown that the hollow part of the shaft C, with the series of filtering-boxes M secured thereon and placed in any water-receptacle similar to the filter-case A and there represented by the vessel S, may, so arranged, serve as an efficient filter.

Having thus described my invention, what I claim, and desire to secure by Letters Patent, is—

1. A filtering apparatus comprising a water-receiving case, a tubular shaft extending through and revoluble in said case and having openings through its side to receive filtered water, a porous, earthen, filtering-cylinder supported on and surrounding said shaft, one or more filtering elements contained in said cylinder, and one or more cylinder-cleaning scrapers supported in said case for action against the surface of said cylinder, substantially as described.

2. A filtering apparatus comprising a water-receiving case, a tubular shaft extending through and revoluble in said case and having openings through its side to receive filtered water, a porous, earthen, filtering-cylinder supported on and surrounding said shaft, a filtering element in said cylinder comprising one or more filtering-boxes M, carried on said shaft, and receiving water from the interior of said cylinder and delivering the same into said shaft, and one or more cylinder-cleaning scrapers supported in said case for action against the surface of said cylinder, substantially as described.

3. A filtering apparatus comprising a hollow shaft having perforations through its sides, one or more filtering-boxes carried on said shaft and communicating by the interior thereof with said perforations, each of said filtering-boxes consisting of two concavo-convex metal plates each having a border containing border-separating projections, whereby a contracted water-passage is formed therebetween, and a water-containing vessel in which said shaft and filtering-boxes are secured, substantially as described.

4. A filtering apparatus for receiving, cleansing, and delivering water from a vessel in which it may be secured, comprising a hollow shaft having perforations through its sides, one or more filtering-boxes carried on said shaft and communicating by the interior thereof with said perforations, each of said filtering-boxes consisting of two concavo-convex metal plates, each having a flat border containing border-separating projections whereby a contracted water-passage is formed therebetween and a water-containing vessel in which said shaft and filtering-boxes are secured, substantially as described.

CHARLES H. RHOOD.

Witnesses:
H. A. CHAPIN,
K. I. CLEMONS.